(No Model.) 3 Sheets—Sheet 1.

W. F. MODES.
GLASS TANK FURNACE.

No. 487,286. Patented Dec. 6, 1892.

WITNESSES
Edward L. Farrell
Alfred Ramel

INVENTOR
William F. Modes,
By Paul Bakewell
Atty.

(No Model.) 3 Sheets—Sheet 2.
W. F. MODES.
GLASS TANK FURNACE.
No. 487,286. Patented Dec. 6, 1892.
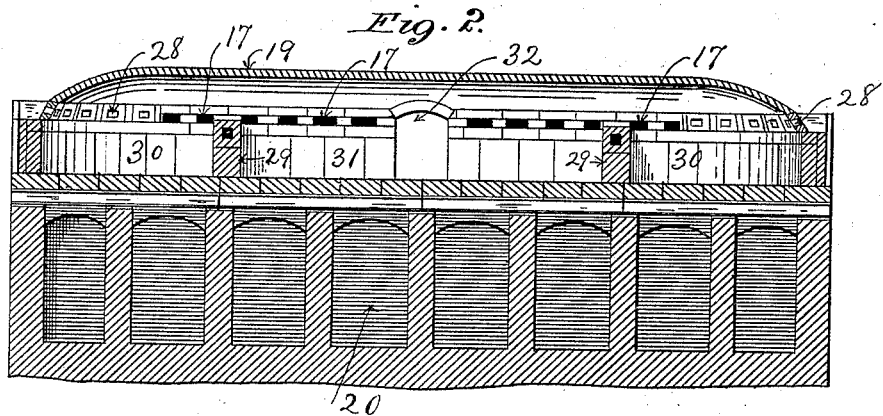
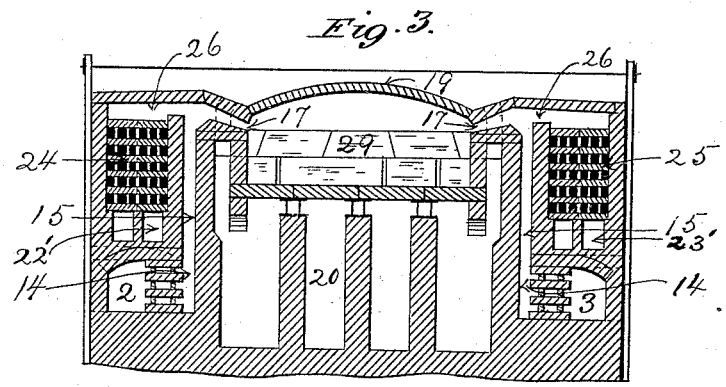
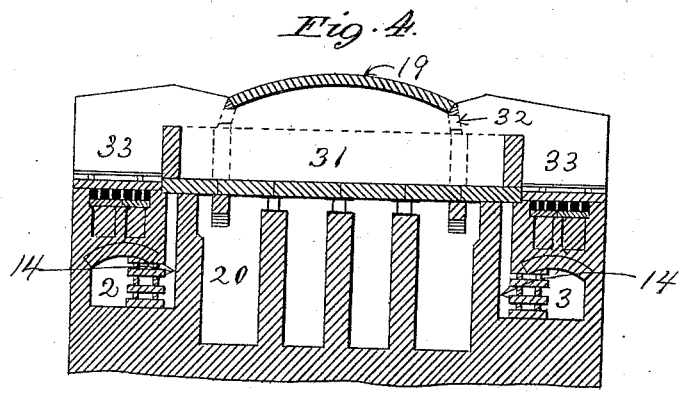
WITNESSES
Edward W. Furrell
Alfred Ramel
INVENTOR
William F. Modes.
By Paul Bakewell
atty.

(No Model.)

W. F. MODES.
GLASS TANK FURNACE.

No. 487,286. Patented Dec. 6, 1892.

Witnesses
Edward C. Furrell
Alfred Ramel

Inventor
William F. Modes,
By Paul Bakewell
Atty.

UNITED STATES PATENT OFFICE.

WILLIAM F. MODES, OF STREATOR, ILLINOIS.

GLASS TANK-FURNACE.

SPECIFICATION forming part of Letters Patent No. 487,286, dated December 6, 1892.

Application filed May 5, 1892. Serial No. 431,921. (No model.)

*To all whom it may concern:*

Be it known that I, WILLIAM F. MODES, a citizen of the United States, residing at Streator, in the county of La Salle and State of Illinois, have invented certain new and useful Improvements in Glass Tank-Furnaces, of which the following is a full, clear, and exact description.

My invention relates to new and useful improvements in the construction of two-part glass tank-furnaces, and has for its object an improved form of construction enabling an increase in the working capacity of the furnace.

It consists in the novel features of construction hereinafter described adapting a furnace constructed with a melting part situated between two working-out parts at either end of the same to practical employment.

Figure 1:
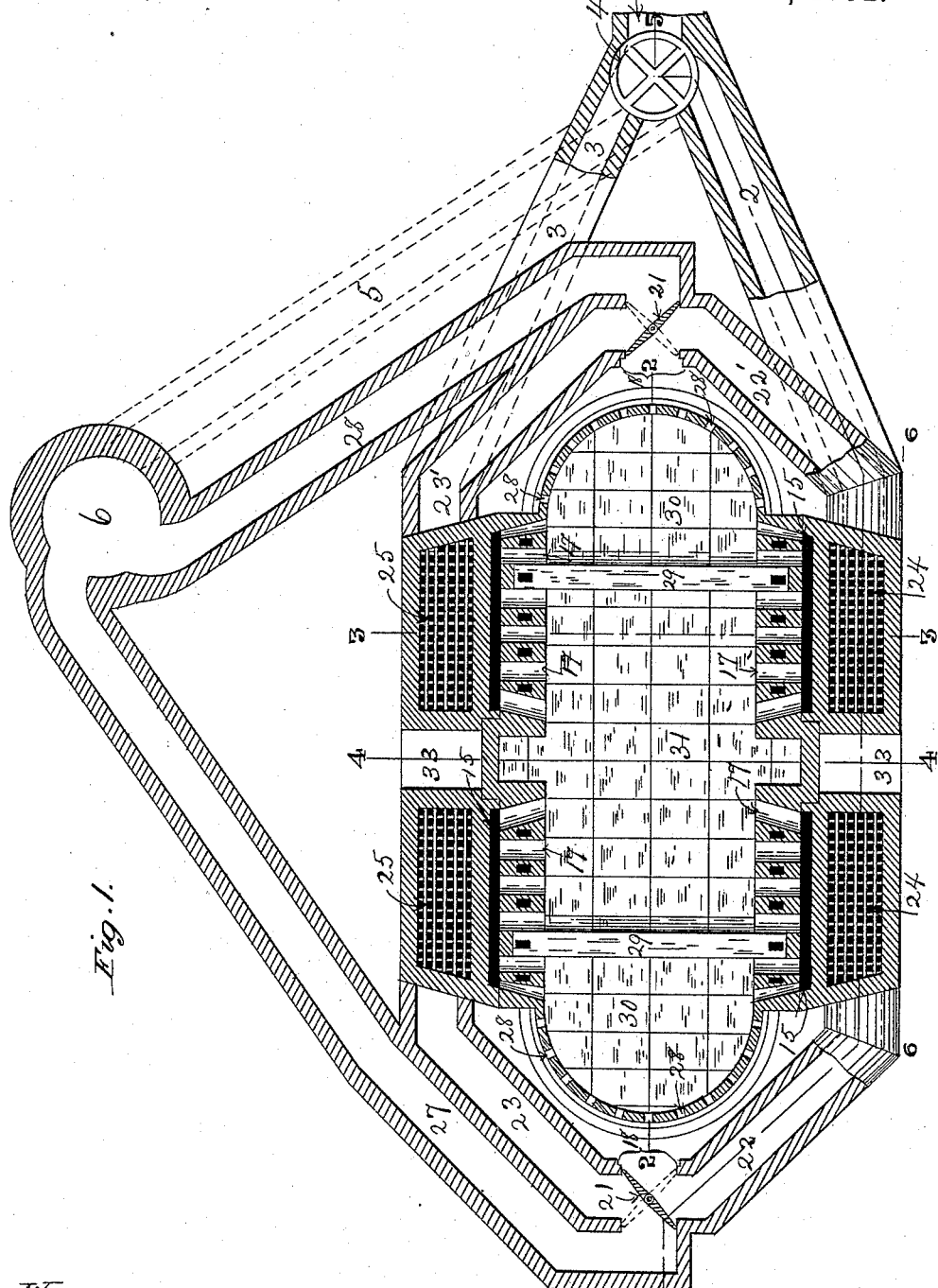
Figure 5:
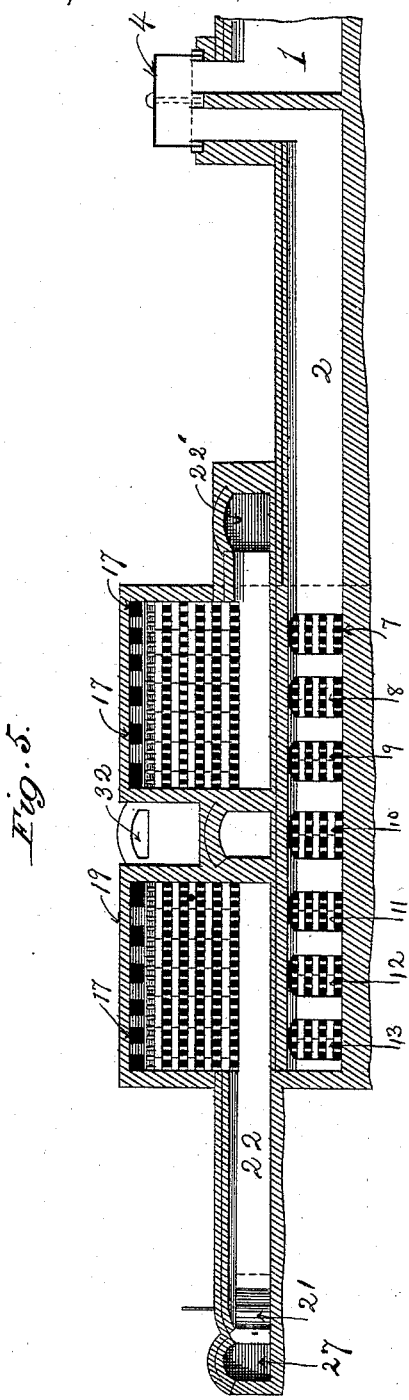
Figure 6:
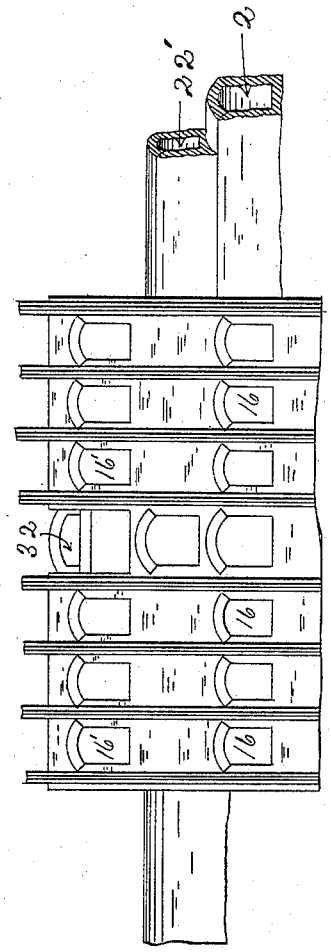

In the accompanying drawings, in which like numerals of reference denote like parts in the several views, Figure 1 is a horizontal section of my improved furnace, showing in a general plan view the arrangement of the gas and draft flues to and from, respectively, the furnace as a whole. Fig. 2 is a vertical longitudinal section of the furnace proper, taken as on the line 2 2 in Fig. 1. Figs. 3 and 4 are vertical cross-sections of the same, taken, respectively, as on the lines 3 3 and 4 4 in Fig. 1. Fig. 5 is a sectional view taken vertically as on the line 5 5 in Fig. 1, and Fig. 6 is an elevational view of the side of the furnace or a view taken as on the line 6 6 in Fig. 1.

In the furnace the subject of this application I have incorporated features of improvement the subject-matter of United States Patents Nos. 306,089 and 469,406, granted to myself on October 7, 1884, and February 23, 1892, respectively. The system of underground gas and draft flues and the gas-valves and draft-dampers are practically similar to what is described and illustrated in the above-referred-to patent, No. 306,089.

1 is the main gas-flue from the gas-generators or other source from which gas may be procured, (not shown,) and 2 and 3 are the branch flues leading from the main flue 1 to either side of the furnace. (See Figs. 1, 3, 4, and 5.) The flow of the gas is directed from the main flue 1 to either of the branch flues 2 and 3, as desired, by the water-valve 4, the construction and method of operation of which is set forth in the aforementioned patent, No. 306,089. At the same time that the main flue 1 is connected with one of the branch flues, as 2 in Fig. 1, by the gas-valve 4 the other branch gas-flue 3 is connected with the auxiliary draft-flue 5, leading to the stack 6, and vice versa. The flues 2 and 3 extend along the full length of the sides of the furnace, and passages 7, 8, 9, 10, 11, 12, and 13 are formed leading therefrom to a gas-space 14, which extends along the side of the furnace (see Figs. 3 and 4) and from which extends the vertical gas-flues 15, formed in the side walls of the furnace. Openings 16 are formed in the outer side walls of the furnace structure, (see Fig. 6,) by which means is provided to clean out, when necessary, the checker brickwork which is placed in the gas-passages 7 8 9, &c. These openings 16 are of course closed when the furnace is being worked. The flues 15 terminate in the ports 17, leading to the interior of the furnace immediately beneath the roof 19 of the same. (See Figs. 1, 2, and 3.) The construction of the part just described is similar on each side of the furnace.

Air is fed to the furnace from both ends at the same time through the ports 18, (see Fig. 1,) which communicate with the open air-space 20 below the furnace, and by means of the diagonal deflection-gates 21 is directed to either side of the furnace, as may be desired, through the flues 22 22' and 23 23'. The flues 22 22' and 23 23' extend from either port 18 along either side of the furnace to approximately the middle of the length of the furnace, where they terminate and are closed by a wall immediately below the passage-way 33, hereinafter described, as shown in Fig. 4. As shown in Fig. 3, the flues 22 22' and 23 23' communicate, respectively, with the regenerating-chambers 24 and 25 (see Figs. 1 and 5) and these through passage-ways 26 (see Fig. 3) with the ports 17 described. At the same time, as is shown in Fig. 1, that the deflecting gate-plates 21 are turned to direct fresh air to the air-flues leading to one side of the furnace, as 22 and 22' in Fig. 1, they open communication between the other flues 23 and 23' from the other side of the furnace to the draft-flues 27 28, leading to the stack 6. In this way the flues 22 22' and 23 23' are made alternatively air and draft flues.

The furnace proper is formed, as indicated in Fig. 1, with semicircular ends, in the walls of which are formed the working-out holes 28, the two skimming bridge-walls 29 dividing it in its length into three parts, the two working-out parts 30 at each end and the intermediate central melting part 31. The furnace is charged from the center of the sides, openings 32 being provided therefor.

The regenerative chambers on each side of the furnace, respectively, are divided at approximately the middle of their length corresponding to the length of the furnace, thereby providing two independently-operative regenerators on each side of the furnace. The adjacent ends of the regenerative-chambers are somewhat separated, forming the passage-way 33, by which means is provided to reach the charging-openings 32. These passage-ways 33 also serve in this form of construction to divide the regenerative chambers on each side of the furnace into two distinctly-separate parts, forming at the same time by such division a convenient means to reach the charging-openings 32. As was stated in regard to the flues 22 22' and 23 23', in a similar manner the ports 17 on either side of the furnace are alternatively used as inlet-ports for the gas and air to produce combustion and as outlet-ports for the products of combustion—that is, the furnace is fired from one side, the draft being toward the other side, and vice versa. In this case it is evident from an inspection of Fig. 3 that part of the products of combustion coming from the furnace in this way will go down the gas-flues 15 and into the gas branch flue 3, when being operated, as indicated in the drawings. For this reason the gas-valve 4 is constructed so as to connect this flue with the auxiliary draft-flue 5, as indicated by the arrow 34 in Fig. 1 thereat.

The furnace being charged from the middle, and the melting part being in the mid-length of the furnace, the highest temperature is necessary at this part of the same. For this purpose the ports 17 are made comparatively larger near the center of the sides of the furnace. In order that the glass in the working-out ends may be kept at the proper temperature, there are placed two of the ports 17 on that side of the bridge-walls 29. These ports when used as outlet-ports on the other side also act to clear the working-out ends of any smoke that may come over the bridge-walls from the middle melting part.

In operation, as already stated, the furnace is fired first from one side and then from the other, the gas-valve 4 and deflection-gates 21 being changed together. The change is made in practice about every twenty or thirty minutes. By this means the brick checker-work in the regenerating-chambers 24 and 25 on one side is first heated by the products of combustion coming from the furnace, and then when the change is made used as regenerators to heat the air to produce combustion.

The main feature of improvement consists in the construction adapting air to be independently fed to either end of the furnace at the same time, in combination with the gas, being conducted to the furnace from one end, and in the consequent feature of the four independently-operated regenerative chambers, one at either end of both sides of the furnace. By this means the proper degree of temperature can be maintained at the different parts of the furnace—i. e., there is thereby rendered possible a more even distribution of the gas to the farther part of the furnace from the end which is first reached by the gas when conducted thereto from one end, as shown and described, and this form of construction and consequent method of operation has this additional feature of advantage over former forms in that it keeps the working-out end nearest to the gas-supply clear from smoke—i. e., enables the air-supply at that end to practically control, and that independently of the other end, the induction of the gas.

I claim—

1. In a glass-melting furnace provided with regenerators along the sides of the same, the combination, with a central melting part and two working parts, one situated at each end of the melting part and separated therefrom by a skimmer-wall, of charging-openings in each side of the melting part and a passage-way leading to the said charging-opening and extending between the said regenerative chambers, dividing the same into two operatively-separate parts, substantially as and for the purposes described.

2. In a glass-melting furnace, the combination, with two independent regenerators on each side of the furnace, of independent air-conduction flues leading thereto, gas-flues leading to each side of the furnace and extending continuously the full length of the two regenerators, and gas and air induction ports opening into the interior of the furnace along the upper edges of the side walls, substantially as and for the purposes described.

3. In a glass-melting furnace, the combination, with the central melting part, working-out parts situated at each end thereof, and charging-openings to the melting part, of two independently-operative regenerative chambers situated on each side of the furnace, the adjacent end walls of said chambers forming a passage-way to the charging-opening, substantially as and for the purposes described.

4. In a glass-melting furnace provided with regenerators along each side of the same, the combination, with a central melting part and two working parts situated at each end of the melting part and separated therefrom by a skimmer-wall, of charging-openings in the sides of the melting part, a passage-way leading to the charging-openings and dividing the regenerators on each side of the furnace into two distinct portions, individual air-flues leading to the different regenerators, gas-flues extending continuously along each side of the furnace, and gas and air induction ports opening into the interior of the furnace along the upper edge of the side walls, substantially as and for the purposes described.

5. A glass tank-furnace of the character described, consisting in a middle melting part and a working-out part at either end, and gas and air flues terminating in ports common to both, leading to the interior of the furnace, the openings through said ports being comparatively larger at the middle of the length of said furnace than near the end of the furnace, substantially as described, and for the purposes specified.

In testimony whereof I have affixed my signature, in presence of two witnesses, this 21st day of April, 1892.

WILLIAM F. MODES.

Witnesses:
A. RAMES,
H. K. WAGNER.